United States Patent
Seenappa et al.

(10) Patent No.: US 9,578,541 B2
(45) Date of Patent: Feb. 21, 2017

(54) PROXIMITY BASED SUB-POOLING OF NETWORK DEVICES IN MOBILE WIRELESS NETWORKS

(71) Applicant: AT&T Intellectual Property I, LP, Atlanta, GA (US)

(72) Inventors: Vikram Seenappa, Sammamish, WA (US); Rajendra Prasad Kodaypak, Sammamish, WA (US); Jiansong Wang, Parlin, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 118 days.

(21) Appl. No.: 14/679,395

(22) Filed: Apr. 6, 2015

(65) Prior Publication Data
US 2016/0295449 A1     Oct. 6, 2016

(51) Int. Cl.
*H04B 7/00* (2006.01)
*H04W 28/02* (2009.01)
(Continued)

(52) U.S. Cl.
CPC ....... *H04W 28/0236* (2013.01); *H04W 24/08* (2013.01); *H04W 80/06* (2013.01)

(58) Field of Classification Search
CPC . H04W 28/0236; H04W 24/08; H04W 80/06; H04L 47/10; H04L 47/30;
(Continued)

(56) References Cited

U.S. PATENT DOCUMENTS 8,213,957 B2   7/2012   Bull et al.
8,229,432 B2   7/2012   Fox et al.
(Continued)

FOREIGN PATENT DOCUMENTS

EP     2705715 A1     3/2014

OTHER PUBLICATIONS

Araniti, Giuseppe et al., "LTE for vehicular networking: A survey", Communications Magazine, IEEE 51.5 (2013): 148-157.
(Continued)

*Primary Examiner* — Brenda H Pham
(74) *Attorney, Agent, or Firm* — Guntin & Gust, PLC; Ralph Trementozzi

(57) ABSTRACT

Aspects of the subject disclosure may include, for example, determining message transfer delays based on transport layer control information associated with network traffic of a backhaul network coupled between a number of core network nodes of a wireless network and a wireless access node of the wireless network. The message transfer delays are representative of the network traffic between the core network nodes and the wireless access node. Weighting factors are assigned to the core network nodes based on the message transfer delays. The weighting factors are exposed to a scheduler that identifies a first group of core network nodes and a second group of core network nodes based on the weighting factors. The wireless access node preferentially establishes communications via the first group of core network nodes. The wireless access node establishes communications via the second group, responsive to an inability to establish communications via any core network nodes the first group. Other embodiments are disclosed.

20 Claims, 9 Drawing Sheets

(51) Int. Cl.
*H04W 24/08* (2009.01)
*H04W 80/06* (2009.01)

(58) Field of Classification Search
CPC ..... H04L 47/11; H04L 47/12; H04L 12/5602; H04L 2012/5636; H04L 2012/5632; H04L 47/35
USPC .... 370/229, 232, 235, 252, 310.2, 328, 338, 370/395.3
See application file for complete search history.

(56) References Cited

U.S. PATENT DOCUMENTS

| | | | |
|---|---|---|---|
| 8,254,877 | B2 | 8/2012 | Edge et al. |
| 8,428,610 | B2 | 4/2013 | Chowdhury et al. |
| 8,467,397 | B2 | 6/2013 | Lysejko et al. |
| 8,509,169 | B2 | 8/2013 | Van Der Merwe et al. |
| 8,538,435 | B2 | 9/2013 | Immendorf et al. |
| 8,639,260 | B2 | 1/2014 | Fox et al. |
| 8,750,123 | B1 | 6/2014 | Alisawi |
| 8,908,507 | B2 | 12/2014 | Kowali |
| 8,924,527 | B2 | 12/2014 | Ramankutty et al. |
| 8,934,373 | B2 | 1/2015 | Smith |
| 9,088,870 | B2 * | 7/2015 | Busin ............... G01S 5/0242 |
| 9,220,035 | B2 * | 12/2015 | Miura ............... H04W 28/08 |
| 2010/0291943 | A1 | 11/2010 | Mihaly et al. |
| 2012/0028626 | A1 | 2/2012 | Marocchi et al. |
| 2012/0155282 | A1 | 6/2012 | Dorenbosch |
| 2013/0083650 | A1 * | 4/2013 | Taleb ............... H04W 8/30 370/218 |
| 2013/0143542 | A1 | 6/2013 | Kovvali et al. |
| 2013/0295948 | A1 | 11/2013 | Ye et al. |
| 2014/0003254 | A1 | 1/2014 | Andreoli-Fang et al. |
| 2014/0146673 | A1 | 5/2014 | Parker |
| 2014/0269269 | A1 | 9/2014 | Kovvali et al. |
| 2014/0274097 | A1 | 9/2014 | Chen et al. |
| 2014/0357289 | A1 | 12/2014 | Smith |
| 2015/0011233 | A1 | 1/2015 | Kazmi |

OTHER PUBLICATIONS

Ferragut Martinez-Vara De Rey, Jaime, "Traffic and mobility management in large-scale networks of smal cells", 2014.
Karonis, Ilias, "RAN Evaluation of LTE-FemtocellDeployment and TV White SpaceSecondary Usage", 2012.
Kibret, Nadew Sikuwaru, "Study of LTE and LTE-Advanced as a Low Cost Backhauling Solution for HSPA Small Cells.", 2014.
Öztürk, Utku, "Coordinated Multipoint Transmission in Femtocell Systems", 2011.
Sarwar, Ali et al., "RRLP (LPP and LPPe) Based Open Source Mobile Multi-GNSS Assisted GNSS Assistance Model", International Conference on Indoor Positioning and Indoor Navigation. vol. 13. 2012.

* cited by examiner

100

300

400

PROXIMITY BASED SUB-POOLING OF NETWORK DEVICES IN MOBILE WIRELESS NETWORKS

FIELD OF THE DISCLOSURE

The subject disclosure relates to proximity based sub-pooling of network devices in mobile wireless networks.

BACKGROUND

Network devices, such as core network control plane entities or core network nodes of a mobile wireless network, can be deployed in a geo-redundant pool. The geo-redundant pool provides network devices spread across different geographical locations, e.g., hosted in data centers in different cities. In mobile wireless network applications, base transceiver stations can establish connectivity to the network devices spread across the different geographical locations. Such geographic isolation protects network users from outages that might otherwise result from a catastrophic event, e.g., a fire, earthquake, flood, at any one location. In view of such an event, network traffic can simply be directed to other network devices in the pool locations that otherwise unaffected by the event.

BRIEF DESCRIPTION OF THE DRAWINGS

Reference will now be made to the accompanying drawings, which are not necessarily drawn to scale, and wherein.

DETAILED DESCRIPTION

Figure 1:
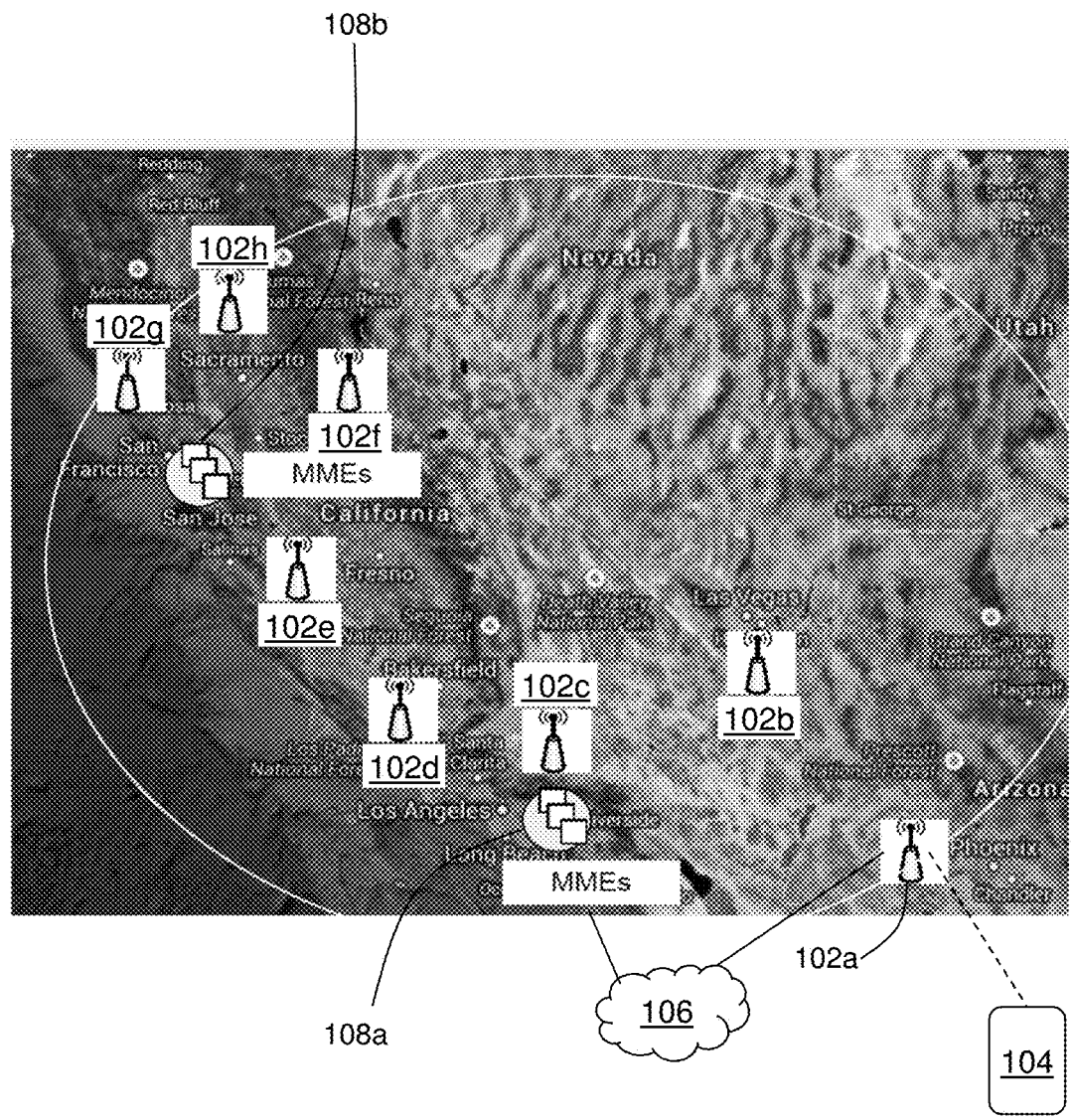
FIG. 1 depicts an illustrative embodiment of wireless communications network providing geo-redundancy.

The subject disclosure describes, among other things, illustrative embodiments for selecting wireless core network nodes, such as MMEs, to facilitate end-to-end communications. In one or more embodiments, the network node, e.g., MME selection can be a proximity-based selection process. In one or more embodiments, the proximity-based selection process for the network nodes, e.g., MMEs can be based on timing parameters, such as round trip delays or times during an S1 setup (e.g., Stream Control Transmission Protocol (SCTP) signaling Smooth Round Trip Time (SRTT)). The same proximity-selection process concept can be extended to select other wireless core nodes, e.g., SGW, PGW, HSS, GMLC, MTC-IWF, etc.

In one or more embodiments, methods and systems can determine transport latency in a backhaul network between a wireless base station and a number of redundant core network nodes of a wireless communications network. At least some of the redundant core network nodes can be geographically separated from others of the redundant core network nodes, with some of the redundant core network nodes being more proximate to the wireless base station than others. The redundant core network nodes can be distinguished based on the transport latency, such that the wireless base station prefers communication connectivity through the more proximal core network nodes. Other embodiments are described in the subject disclosure.

One or more aspects of the subject disclosure include a proximity based selection algorithm to minimize signaling impacts of base station selections of control plane entities, e.g., core network nodes, in a wireless mobile network configured with geo-redundant control plane entities, such as MMEs. A weighting factor can be allocated for each control plane entity, MME, on a per-base station basis, wherein the weighting factor is based on network transport latency. Differentiating among the geo-redundant MMEs based on network transport latency at each eNB, allows for selection of an MME based on latency estimation. Latency estimation can be determined according to various techniques, such as a SCTP SRTT measurements obtained during a S1-MME link setup establishment. The same proximity-selection process concept can apply to other wireless core network node selections when they are configured in a geo-redundancy manor either as a mated pair or as a geo-redundancy pool. The transport latency estimate is pertained to the protocols that peer nodes use them to communication each other. For an example, each eNB could select an optimized S1-U link to one of the SGWs in a SGW geo-redundancy pool if the SGW is deployed in such a way.

The algorithm can be implemented according to various approaches. For example the algorithm can be based on a static allocation, in which a relative capacity value is assigned to each MME of the geo-redundant pool based on a static predefined value. The static value can be referred to as an eNB-MME latency range controls. In another variant, the algorithm can be based on a dynamic allocation, wherein a dynamic policy enables proximity based routing based on computation of MME-eNB S1-MME SCTP SRTT and assigning the eNB a specific relative capacity value so that eNBs can establish S1-MME connectivity to all MMEs in the pool but will prefer transmitting S1-MME SCTP data chunks only to specific MMEs in the pool. By doing so, there is a logical creation of an MME sub-pool based on S1-MME RTT values that enables proximity based eNB-MME selection in a geo-redundant pool. The same proximity-selection process concept can be extended to other wireless core nodes when they are deployed in a geo-redundant manor.

One embodiment of the subject disclosure includes a process for accessing transport layer control information associated with network traffic of a backhaul network. The backhaul network is communicatively coupled between a number of core network nodes of a wireless communication network and a radio access node of the wireless communication network. The radio access node is communicatively coupled to the number of core network nodes by way of the backhaul network. A number of message transfer delays are determined based on the transport layer control information.

The message transfer delays are representative of the network traffic between the number of core network nodes and the radio access node. A number of weighting values or factors are assigned to the number of core network nodes based on the number of message transfer delays. The number of weighting factors are exposed to a scheduler that identifies a first group of core network nodes of the number of core network nodes and a second group of core network nodes of the number of core network nodes based on the number of weighting factors. The radio access node establishes communications with both groups of signaling nodes for geo-redundancy but preferentially sends communications messages via a core network node of the first group of core network nodes under normal circumstances. The radio access node will send communications messages via a core network node of the second group of core network nodes, responsive to an inability to send communications messages via any core network nodes the first group of core network nodes or responsive to increased message transfer delays that cross a critical threshold when communicating with the first group of signaling nodes.

Another embodiment of the subject disclosure includes a device having a processor and a memory that stores executable instructions. The instructions, when executed by the processor, facilitate performance of operations, including determining a number of message transfer delays based on transport layer control information associated with network traffic of a backhaul network. The backhaul network is communicatively coupled between a number of core network nodes of a wireless communication network and a wireless access node of the wireless communication network. The message transfer delays are representative of the network traffic between the core network nodes and the wireless access node. A number of weighting factors are assigned to the number of core network nodes based on the number of message transfer delays. The weighting factors are advertised to a scheduler that identifies a first group of core network nodes of the number of core network nodes and a second group of core network nodes of the number of signaling nodes based on the number of weighting factors. The wireless access node may establish communication links with both groups of signaling nodes for geo-redundancy, but preferentially sends communications messages via a core network node of the first group of core network nodes under the normal circumstances. The wireless access node sends communications messages via a core network node of the second group of core network nodes, responsive to an inability to send communications messages via any core network nodes the first group of core network nodes or responsive to increased message transfer delays that cross a critical threshold when communicating with the first group of signaling nodes.

Yet another embodiment of the subject disclosure includes a machine-readable storage medium, including executable instructions that, when executed by a processor, facilitate performance of operations. The operations include determining a number of latency values associated with network traffic of a backhaul network. The backhaul network is communicatively coupled between a number of core network nodes of a wireless communication network and a wireless access node of the wireless communication network. The wireless access node is associated with the number of core network nodes and communicatively coupled to the number of core network nodes by way of the backhaul network. The operations further include determining a number of weighting factors based on the number of latency values. The weighting factors are assigned with the number of core network nodes. The weighting factors are provided to the wireless access node. The wireless access node identifies a first group of core network nodes of the number of core network nodes and a second group of core network nodes of the number of core network nodes based on the number of weighting factors. The wireless access node may establish communication links with both groups of signaling nodes for geo-redundancy, but preferentially sends communications messages via a signaling node of the first group of signaling nodes under the normal circumstances. The wireless access node will send communications messages via a signaling node of the second group of signaling nodes, responsive to an inability to communicating via any signaling nodes the first group of signaling nodes or responsive to increased message transfer delays which cross a critical threshold when communicating with the first group of signaling nodes.

FIG. 1 depicts an illustrative embodiment of wireless communications network 100 which may be an LTE network, providing geo-redundancy of core network elements. The wireless network 100 may include a number of eNBs 102a . . . 102h, generally 102, and other network entities. An eNB 102 may be a station that communicates wirelessly with mobile devices 104 and may also be referred to as a base station, a Node B, an evolved node B (eNB), an access point, or other term. Each eNB 102 can provide communication coverage for a particular geographic area. In an LTE network, the term "cell" can refer to a coverage area of an eNB and/or an eNB subsystem serving this coverage area.

An eNB 102 can provide communication coverage for a macro cell, a pico cell, a femto cell, and/or other types of cells. A macro cell may cover a relatively large geographic area (e.g., several kilometers in radius) and may allow unrestricted access by mobile devices 104, sometimes referred to as User Equipment (UE). A pico cell may cover a relatively small geographic area and may allow unrestricted access by UEs 104. A femto cell may cover a relatively small geographic area (e.g., a home or business) and may allow restricted access by UEs 104 having association with the femto cell. In general, an eNB can support one or multiple cells.

The wireless network 100 can be a heterogeneous network that includes eNBs of different types, e.g., macro eNBs, pico eNBs, femto eNBs, relays, etc. These different types of eNBs can have different transmit power levels, different coverage areas, and different impact on interference in the wireless network 100. For example, macro eNBs can have a high transmit power level (e.g., about 20 Watts) whereas pico eNBs and femto eNBs may have a lower transmit power level (e.g., about 1 Watt).

The wireless network 100 can support synchronous or asynchronous operation. For synchronous operation, the eNBs 102 can have similar frame timing, and transmissions from different eNBs 102 may be approximately aligned in time. For asynchronous operation, the eNBs 102 can have different frame timing, and transmissions from different eNBs 102 may not be aligned in time. The techniques described herein may be used for both synchronous and asynchronous operation.

A wireless network controller 108, sometimes referred to as a network core, can couple to a set of eNBs 102 and provide coordination and control for these eNBs 102. The wireless network controller 108 can communicate with the eNBs 102 via a backhaul network 106. The eNBs 102 can also communicate with one another, e.g., directly or indirectly via wireless or wireline backhaul network. The backhaul network 106 can be a private network, e.g., owned, operated, and/or leased on behalf of a wireless communication service provider. Alternatively or in addition, the backhaul network 106 can be a public network, such as a packet switched network, e.g., the Internet, or a circuit-switched network. The backhaul network 106 can include one or more of wireline connectivity, fiber optic connectivity, and wireless connectivity. Wireless connectivity can include, without limitation, one or more of a terrestrial radio link, a microwave link, a free-space optical link, a satellite link, and so on.

The UEs 104 can be dispersed throughout the wireless network 100, and each UE 104 may be stationary or mobile. A UE 104 can also be referred to as a terminal, a mobile station, a subscriber unit, a station, mobile entity, or other terminology. A UE 104 can be a cellular phone, a personal digital assistant (PDA), a wireless modem, a wireless communication device, a handheld device, a laptop computer, a cordless phone, or other mobile entities. A UE 104 can be able to communicate with the eNBs 102, whether macro eNBs, pico eNBs, femto eNBs, or other network entities.

In the illustrative embodiment, the wireless network 100 includes two network controllers, or packet cores 108a, 108b arranged in a geo-redundant configuration. That is, each of the eNBs 102 is in communication with or otherwise associated with both network controllers 108a, 108b. For LTE networks, the network controllers 108a, 108b refer to Evolved Packet Cores (EPCs) 108a, 108b, and the eNBs 102 have established over an S1 interface, referred to as S1 connectivity, with both EPCs 108a, 108b. The EPCs 108a, 108b are geospatially separated, with one EPC 108a located in the Los Angeles area and another EPC 108b located in the San Francisco area. Communications serving UEs 104 from any of the eNBs 102 can be serviced through either of the EPCs 108a, 108b.

Proximity based eNB-MME selection logic enable eNBs 102 in an operator network to establish S1-MME SCTP associations to all the MMEs in a pool but based on the Smooth RTT (SRTT) measurements, the MME assigns a relative capacity value to the eNB and the eNB prefers to transmit S1-MME SCTP data chunks to the MME that advertised a higher MME relative capacity, while still maintaining idle S1-MME SCTP associations to other MMEs in the pool that advertised a lower relative weight factor, or value.

Proximity based S1-MME link selections, eNB-MME selection can include logic on the MME, in which the MME extracts the SCTP SRTT measures per SCTP transport block implemented in the hardware platform and assign a relative weight factor based on a predefined policy, e.g., static and/or dynamic and thresholds, that is operator configurable. The implementation logic on the eNB can be enhanced further to ensure that the eNB transport scheduler selects MME sub-pools that advertise a higher relative capacity to transport any EPS bearer S1-AP context as SCTP data chunks while maintaining idle SCTP associations to the MME sub-pool that advertised a lower relative capacity. In an event if there are any transport path failures or high retransmission timeouts or excessive transport delays, then the eNB scheduler can switch the EPS bearer S1-AP context SCTP data chunks to the idle S1-MME SCTP association and once the transport failure condition or error condition towards preferred MMEs have been cleared, the eNB scheduler may switch back, transmitting S1-MME SCTP data chunks to the proximity based MME sub pool.

To ensure minimal toggling of S1-MME traffic between eNB-MME sub-pools, a time-averaging technique can be applied that uses multiple SCTP SRTT samples collected, stored and averaged over a pre-defined time interval, e.g., a sample window. In some embodiments, the duration of the time interval is configurable. The appropriate MME Relative Capacity weight is assigned to the eNBs based on the averaging to support a preferred or otherwise optimal selection process.

The LTE EPC-core network nodes (MMEs) can be deployed in geo-redundant pools that span at least a minimum of two data centers in distinct geographical locations. A typical deployment scenario is described in the FIG. 1. A hypothetical deployment scenario includes LTE EPC core network nodes (MME) 108a, 108b deployed in a geo-redundant configuration. The MME pool area consists of MMEs 108 deployed in data centers in San Francisco and Los Angeles, each serving a common group of eNBs 102 in California and Arizona geographic regions.

In the hypothetical eNB deployment scenario all the eNBs 102 in the geographical region maintain S1-MME SCTP associations to all the MMEs 108 in the pool located in data centers in San Francisco and Los Angeles area. It is common for eNB implementations to use "round-robin" selection logic to setup any new EPS bearer across the MMEs 108 in a pool and is based on the MME 108 relative capacity weight factor received by the particular eNB 102 during the S1 setup phase. For existing subscribers based on which MME 108 the EPS bearer context exists, the eNB 102 transports any EPS packet data network specific S1-AP application data chunks for any signaling events to that specific MME 108.

According to the geo-redundant configuration, an LTE subscriber in the Los Angeles geographical area may be served by an MME in a San Francisco data center instead of being served locally by a MME logical sub pool in Los Angeles data center. Using a geographically more remote MME generally incurs additional transport layer latency. It is foreseeable that such additional latencies could impact LTE signaling, such as S1-MME SCTP rwnd, call setup time, additional transport network infrastructure, transport network overheads and improper utilization of the backhaul network elements that could be subjected to instantaneous traffic loading.

In geo-redundant MME pool designs, each of the eNBs can act as an SCTP client, while the MMEs act as SCTP servers. The eNBs, as SCTP clients, initiate SCTP association setup procedures through standard four way handshake processes. This is repeated at each eNB, for each of the MMEs in the pool, to establish S1-MME SCTP associations at each eNB with all of the MMEs. The SCTP associations on the peer network elements can be single-homed or multi-homed for resiliency purposes. Those eNBs in a geographical region served by the MMEs of a geo-redundant pool typically assign the same relative capacity value to all the eNBs through S1-MME, S1-AP configuration update management message initiated by the MME. The eNBs respond back with MME configuration management update acknowledge messages.

The techniques disclosed herein differentiate eNB-MME associations according to a proximity based MME sub-pool concept, in which MME relative capacity weight assignment logic can be provided or otherwise enhanced to factor in the S1-MME SCTP sampled SRTT messages and then assign a relative weight factor to the eNBs, e.g., an optimized relative weight factor, based on the sampled RTT messages. This approach takes into account the geographic topology and underlying transport network latency that is calculated through SCTP SRTT in real time. The eNBs prefer to establish S1-AP application information exchange with the closest data center MME sub-pools to transport S1-MME SCTP data chunks for EPS context to ensure that LTE subscribers in a given geographical area are served by the local data center MMEs operating within a predefined latency SRTT range or a latency zone that is configurable on the MMEs.

The techniques disclosed herein do not compromise EPC-signaling core geo-redundancy as the eNBs still maintain idle SCTP associations to all the MMEs in the geo-redundant locations. Should the proximity based data center fail, e.g., in a catastrophic event, the eNB can communicate SCTP data chunks over the idle S1-MME SCTP associations with the home-pool MMEs, turning them into active SCTP associations.

MME application logic enhancements can be included to access an SCTP protocol transport layer and to process SCTP transport control information to determine and otherwise assign relative weight factors based on the sampled SCTP SRTT calculations during SCTP association setup and-establishment phase on a per eNB basis. The MME can calculate or otherwise determine the SRTT on per-eNB SCTP association based on a sampled time interval for SCTP signaling and data chunk messages sent between MME-eNB. The MME application software module should tap into the SCTP daemon resident in the transport control block per eNB fetch the SRTT interval details and compare it against a predefined latency zone SRTT thresholds defined on the MME and then assign a relative capacity weight factor in the MME configuration update S1-AP message back to the eNB. The eNB receives multiple MME configuration update S1-AP messages from all the MMEs in the pool with different relative capacity weights and the eNB replies back with MME configuration update S1-AP acknowledge message to all the MMEs in the pool. The eNB establishes SCTP association with all the MMEs in a geo-redundant pool and receives different relative weight factors from the MMEs in at least two distinct geo-diverse locations based on the SRTT calculation and predefined latency zone thresholds. The eNB scheduler then starts distributing new LTE users attaching into the network towards the MME that advertised a higher relative capacity compared to the MMEs that advertised a lower relative capacity value.

The eNB scheduler can include or otherwise access a data store, e.g., a database, that maintains a record of the SCTP associations per MME and the assigned MME Relative Capacity values to ensure any LTE subscribers attaching and/or re-attaching to the LTE network prefer the MME sub-pool closest to the eNB based on the underlying transport network latency.

Figure 2:
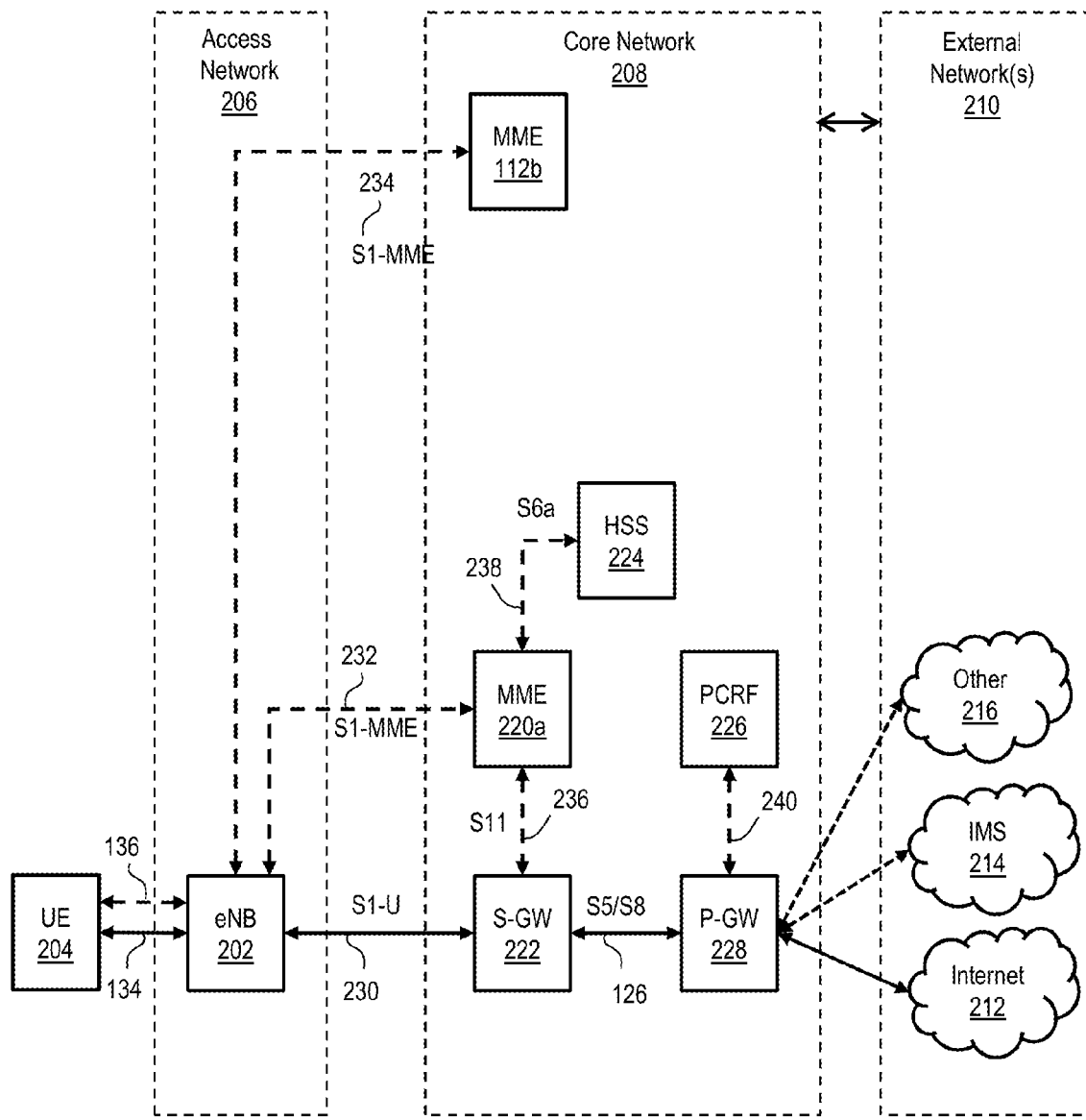
FIG. 2 depicts, in more detail, an illustrative embodiment of a core portion of an LTE wireless communications network providing geo-redundancy.

FIG. 2 illustrates an example LTE architecture 200, which can be based in part on standards developed by the 3rd Generation Partnership Project (3GPP). In one embodiment, the LTE network architecture 200 includes an access network 206, a core network 208a, 208b, e.g., an EPC or Common BackBone (CBB) and one or more external networks 210, sometimes referred to as PDN or peer entities. The external networks 210 can include one or more trusted and non-trusted external networks such as an internet protocol (IP) network 212, an IP multimedia subsystem (IMS) network 214, and other networks 216, such as a service network, a corporate network and the like.

The access network 206 can include an LTE network architecture sometimes referred to as Evolved Universal mobile Telecommunication system Terrestrial Radio Access (E UTRA) and evolved UMTS Terrestrial Radio Access Network (E-UTRAN). Broadly, the access network 206 can include one or more eNBs 202. During network operations, at least one eNB 202 communicates directly with a UE 204. Such UEs 204 can connect to the eNBs 202 when the UE 204 is within range according to a corresponding wireless communication technology.

The UE 204 generally runs one or more applications that engage in a transfer of packets between the UE 204 and one or more of the external networks 210. Such packet transfers can include one of downlink packet transfers from the external network 210 to the UE 204, uplink packet transfers from the UE 204 to the external network 210 or combinations of uplink and downlink packet transfers. Applications can include, without limitation, web browsing, VoIP, streaming media and the like. Each application can pose different Quality of Service (QoS) requirements on a respective packet transfer. Different packet transfers can be served by different bearers within the core network 208, e.g., according to parameters, such as the QoS.

The core network 208 uses a concept of bearers, e.g., EPS bearers, to route packets, e.g., IP traffic, between a particular gateway in the core network 208 and the UE 204. A bearer refers generally to an IP packet flow with a defined QoS between the particular gateway and the UE 204. The access network 206, e.g., E UTRAN, and the core network 208 together set up and release bearers as required by the various applications.

In one embodiment, the core network 208 includes various network entities, such as an MME 220a, a SGW 222, a Home Subscriber Server (HSS) 224, a Policy and Charging Rules Function (PCRF) 226 and a Packet Gateway (PGW) 228. In one embodiment, the MME 220a comprises a control node performing a control signaling between various equipment and devices in the access network 206 and the core network 208. The protocols running between the UE 204 and the core network 208 are generally known as Non-Access Stratum (NAS) protocols.

For illustration purposes only, the terms MME 220, SGW 222, HSS 224 and PGW 228, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE architectures, the SGW 222 routes and forwards all user data packets. The SGW 222 also acts as a mobility anchor for user plane operation during handovers between base stations, e.g., during a handover from a first eNB 202 to another as may be the result of the UE 204 moving from one area of coverage, e.g., cell, to another. The SGW 222 can also terminate a downlink data path, e.g., from the external network 210 to the UE 204 in an idle state, and trigger a paging operation when downlink data arrives for the UE 204. The SGW 222 can also be configured to manage and store a context for the UE 204, e.g., including one or more of parameters of the IP bearer service and network internal routing information. In addition, the SGW 222 can perform administrative functions, e.g., in a visited network, such as collecting information for charging (e.g., the volume of data sent to or received from the user), and/or replicate user traffic, e.g., to support a lawful interception. The SGW 222 also serves as the mobility anchor for interworking with other 3GPP technologies such as universal mobile telecommunication system (UMTS).

At any given time, the UE 204 is generally in one of three different states: "detached", "idle" or "active." The detached state is typically a transitory state in which the UE 204 is powered on but is engaged in a process of searching and registering with the network 200. In the active state, the UE 204 is registered with the access network 206 and has established a wireless connection, e.g., radio resource control (RRC) connection, with the eNB 202. When the UE 204 is idle, the SGW 222 can terminate a downlink data path, e.g., from one of the peer entities 210, and triggers paging of the UE 204 when data arrives for the UE 204. If the UE 204 responds to the page, the SGW 222 can forward the IP packet to the eNB 202.

The HSS 224 can manage subscription-related information for a user of the UE 204. For example, the HSS 224 can store information such as authorization of the user, security requirements for the user, QoS requirements for the user, etc. The HSS 224 can also hold information about the external networks 210 to which the user can connect, e.g., in the form of an APN of the external networks 210. For example, the MME 220*a* can communicate with the HSS 224 to determine if the UE 204 is authorized to establish a call, e.g., a VoIP call before the call is established.

The PCRF 226 can perform QoS management functions and policy control. The PCRF 226 is responsible for policy control decision-making, as well as for controlling the flow-based charging functionalities in a policy control enforcement function (PCEF), which can reside in the PGW 228. The PCRF 226 provides the QoS authorization, e.g., QoS class identifier and bit rates that decide how a certain data flow will be treated in the PCEF and ensures that this is in accordance with the user's subscription profile.

The PGW 228 can provide connectivity between the UE 204 and one or more of the external networks 210. In the illustrative network architecture 200, the PGW 228 can be responsible for IP address allocation for the UE 204, as well as one or more of QoS enforcement and flow-based charging, e.g., according to rules from the PCRF 226. The PGW 228 is also typically responsible for filtering downlink user IP packets into the different QoS-based bearers. In at least some embodiments, such filtering can be performed based on traffic flow templates. The PGW 228 can also perform QoS enforcement, e.g., for guaranteed bit rate bearers. The PGW 228 also serves as a mobility anchor for interworking with non-3GPP technologies such as CDMA2000.

Within the access network 206 and the core network 208 there may be various bearer paths/interfaces, e.g., represented by solid lines 230 and 232. Some of the bearer paths can be referred to by a specific label. For example, the solid line 230 can be considered an S1-U bearer and the solid line 232 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 208 can include various signaling bearer paths/interfaces, e.g., control plane paths/interfaces represented by dashed lines 234, 236, 238 and 240. Some of the signaling bearer paths may be referred to by a specific label. For example, the dashed line 232 can be considered as an S1-MME signaling bearer, the dashed line 236 can be considered as an S11 signaling bearer and the dashed line 238 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

It should be noted that the access network 206 and the core network 208 are illustrated in a simplified block diagram in FIG. 2. In other words, either or both of the access network 206 and the core network 208 can include additional network elements that are not shown, such as various routers, switches and controllers. In addition, although FIG. 2 illustrates only a single one of each of the various network elements, it should be noted that the access network 206 and the core network 208 can include any number of the various network elements. For example, the core network 208 can include a pool (i.e., more than one) of MMEs 112, SGWs 114 or PGWs 120. A second MME 112*b* is shown for purposes of illustration.

Figure 3:
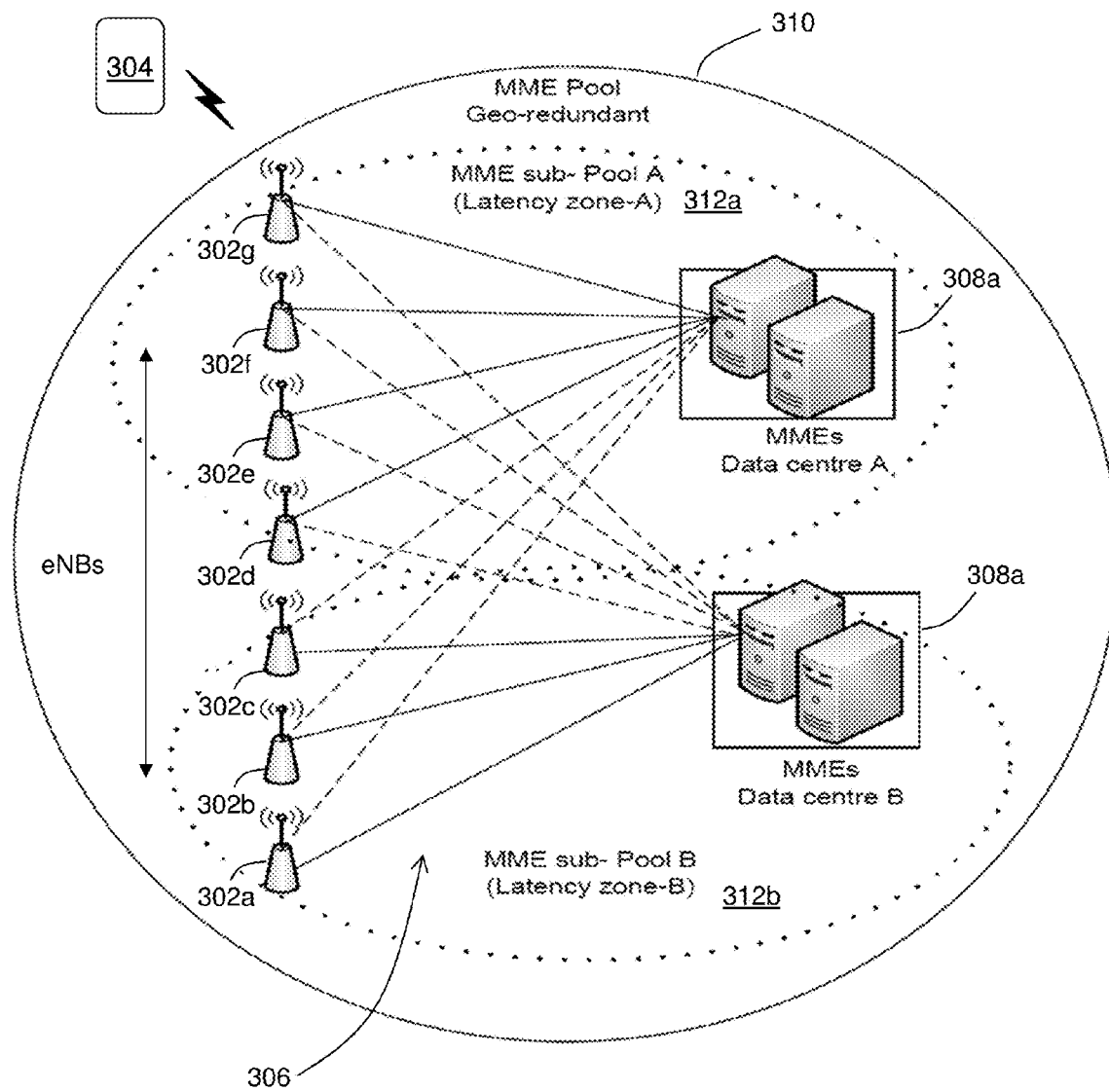
FIG. 3 depicts another illustrative embodiment of wireless communications network providing geo-redundancy.

FIG. 3 depicts another illustrative embodiment of wireless communications network 300 providing geo-redundancy. The network 300 includes a number of eNBs 302*a* . . . 302*g*, generally 303 and two geographically separated data centers 308*a*, 308*b*, generally 308. Each of the data centers 308 includes a respective number of core network nodes, such as MME nodes 308 of an LTE network. Collectively, the MME nodes 308 are referred to as being pooled. That is, each of the base stations is communicatively coupled to the MME nodes 308 at each of the data centers 308 by way of a backhaul network 306.

By their geographical separation, it is understood that some of the eNBs 302 are closer to the first data center 308*a*; whereas, others of the eNBs 302 are closer or proximal to the second data center 308*b*. Message latencies resulting from communications between the eNBs 302 and the MMEs 308, will vary according to a proximity or corresponding network distance. Physically, there may be greater or lesser lengths of cable depending upon which data center 308. Alternatively or in addition, there may be a greater number of intermediate network nodes, different network congestion states, and so on. In some instances, differences in network performance can be inferred, at least in part, from rated performance, e.g., as set forth in SLAs or other forms of specification.

Transport latency, whether measured, calculated, or determined from some combination of both, can be determined from each MME 308 of the pooled MMEs 308 to each eNB 302 of the number of eNBs 302. Such calculations can be determined, e.g., according to relative capacity logic of the MMEs 308. Alternatively or in addition, such determinations can be implemented by another device, such as a separate geo-redundant controller, by the eNBs 302, by some other core network node of the wireless network, or by some combination thereof.

The transport latency values, once obtained, can be used to differentiate or otherwise distinguish eNB-MME pairs. For example, an MME 308 can determine transport latency values to each of the eNBs 302. The resulting transport latency values can be compared to a predetermined threshold value, resulting in a determination whether a transport latency value of the particular eNB-MME pair is above or below the threshold.

The result of such a comparison can be used to distinguish MMEs 308 of the pool. Namely, those eNB-MME pairs for which the comparison is below the threshold can be characterized as a proximate sub-pool. Likewise, other eNB-MME pairs for which the comparison is above the threshold can be characterized as a remote sub-pool. The results of such comparisons can be associated with each eNB at each MME. The MME can determine or otherwise assign a weighting factor or value for each eNB based on the comparison results. At each MME, the weighting factors corresponding to a particular eNB can be provided, exposed or otherwise advertised to the eNB. The eNB, receiving weighting factors from each of the MMEs can associate the MMEs with the corresponding sub-pools. This allows the eNB to establish new connections with MMEs from a proximate sub-pool.

In at least some embodiments, other attributes of the backhaul transport network are considered. For example, latency service level agreements (SLAs) of the backhaul transport network are obtained from a Metro Ethernet service provider. Similar offers can be obtained for any other intermediate transport network elements that will be used to transport S1-MME interface traffic. In determining the weighting factors, e.g., according to latency threshold controls on the MME (static or dynamic) can factor in the geographical topology, best case network latency, and worst case network latency with transport network failures conditions.

In at least some embodiments, a latency value can be determined according to an average of multiple samples. For example, the SRTT can be determined as an average SRTT of "N" samples in the last time interval, e.g., in the last "Tn" minutes, as the criteria to decide the relative capacity value. In a next time interval, e.g., Tn+1, the average SRTT of "N" samples is repeated. If the average value has changed significantly, the MME can dynamically change the relative capacity by advertising a lower relative capacity value so that the eNB can prefer the MMEs in a sub-pool that advertised a higher relative capacity value. This can result if the current average SRTT exceeds a predefined delay threshold from a particular eNB to the MME sub-pool. Likewise, if the average SRTT becomes lower than a predefined threshold that is closer to a MME sub-pool, the eNB can be re-assigned to this sub-pool by the MMEs by advertising a higher relative capacity value to the eNB.

Any such geo-redundancy controller logic, including enhanced MME logic, can include MME maintenance mode override functionality to allow for a manual or otherwise directed change of the weighting value, e.g., the MME relative capacity values to a predetermined value, such as zero. Such a directed change can be applied when the MMEs are subject to standard maintenance as well as new software or hardware upgrades. Any MME in, or about to enter a maintenance mode, should advertise to all the eNBs the special relative capacity value, e.g., zero, through an MME configuration update S1-MME S1-AP message. The eNBs reply back with MME configuration update S1-AP acknowledge message back to the MME that will undergo maintenance mode. This ensures that for any new LTE attaches or reattaches, the eNBs will not prefer the MME that advertised the special relative capacity value indicating maintenance mode.

It is understood that the proposed configurations disclosed herein can lead to unequal MME subscriber load distribution across the MMEs in the pool. In at least some configurations, any non-uniform loading aspects of the MMEs can be controlled with an increased number of MMEs deployed in a given pool and/or by scaling the individual nodal capacity.

Figure 4:
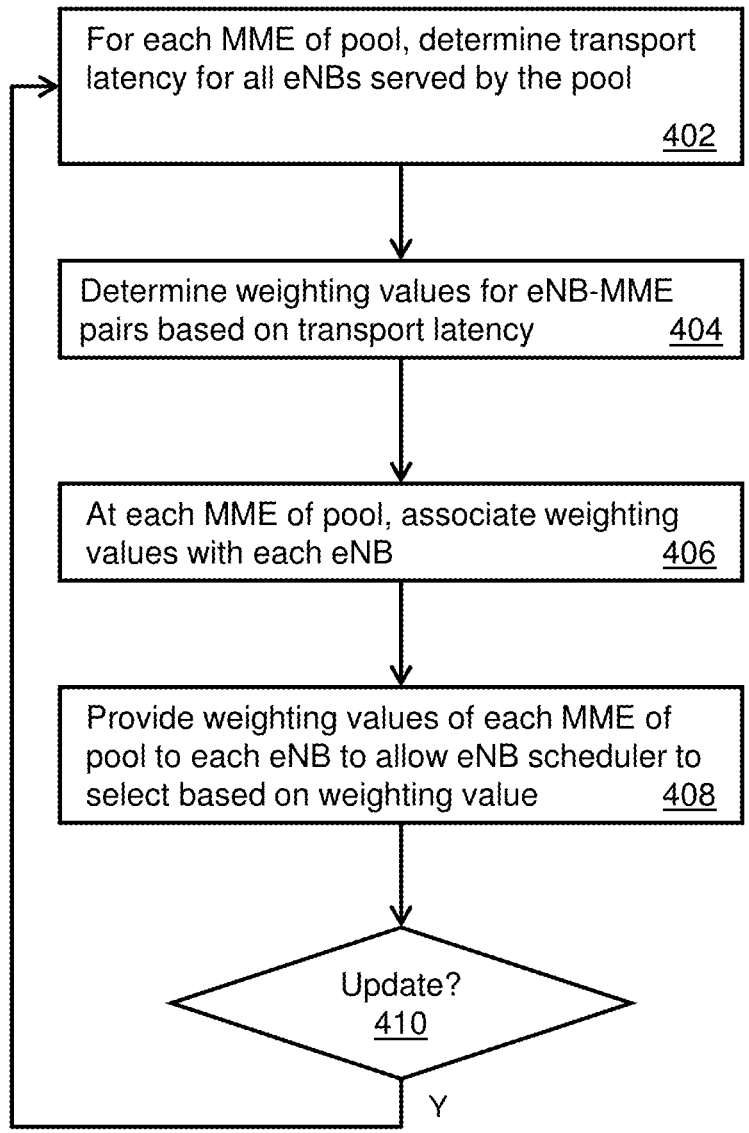
FIG. 4 depicts an illustrative embodiment of a process used in portions of the system described in FIGS. 1-3.

FIG. 4 depicts an illustrative embodiment of a process 400 used in portions of the system described in FIGS. 1-3. The process 400 is implemented in a wireless communication system having a number of wireless access nodes served by geographically dispersed core network nodes, otherwise referred to as control plane entities. In an illustrative example, the network is an LTE network in which the wireless access nodes are eNBs and the core network nodes are MMEs. According to the process 400, a transport latency is determined at 402, at each pooled MME for all eNBs, served by the pool. The latency determination is repeated for each MME of the pooled MMEs.

A weighting factor or value is determined at 404, for each eNB-MME pair based on the corresponding transport latency. The transport latency can be estimated or otherwise calculated, e.g., based on geo-locations of the pooled MMEs and the eNBs. In some embodiments, the estimates can be relative values, e.g., close, far. In other embodiments, the estimates can be based on an estimated network delay between the devices. The network delay can be estimated according to geo-locations. Alternatively or in addition, the network delay can be estimated according to a particular network topology. A weighting factor or value can be determined based on the estimated transport latency.

In at least some embodiments, the transport latency can be based on one or more measurements. Measurements can include dedicated measurements, e.g., according to a specific message sent for a purpose of determining a message. Alternatively or in addition, measurements can include measurements associated with messages of opportunity. In the illustrative examples provided herein a smooth round trip transfer time associated with SCTP transport layer communications can be used. The RTT value can be used as an indicator of latency. A weighting factor or value can be determined based on the SRTT value.

At each MME of the pooled MMEs, the weighting factors are associated at 406 with corresponding eNBs. For example, the MME or some other device adapted to implement the procedure 400 can determine a collection of weighting factors for all of the eNBs served by the pooled MMEs. The associating of the weighting factors with eNBs can be repeated at or for each MME of the pool.

The weighting factors are provided to the eNBs at 408. For example, of each MME of pool can expose or advertise a respective weighting factor associated with the MME-eNB connection. Each MME provides the respective weighting factor, such that the eNB or a scheduler of the eNB has the weighting factors to each of the MMES of the pooled MMEs. Such exposition or advertising allows the eNB or its scheduler to select one of the MMEs based on weighting factor.

In some embodiments, the weighting value provides an indication as to which sub-pool a particular MME belongs to. It is worth noting that the sub-pools disclosed herein are not absolute, such that they can be identified independent of the eNB-MME connectivity. Rather, the sub-pools are relevant from a perspective of each eNB. Consider that an MME in a proximal sub-group from a perspective of a nearby eNB can be in a remote sub-group from a perspective of a remote eNB.

In some embodiments, a determination is made at 410 as to whether the process 400 should be repeated. For example, the process can be repeated periodically, e.g., after some delay time and/or at scheduled intervals, hourly, daily, weekly, monthly and so on. Alternatively or in addition, the process 400 can be repeated in response to an event. Events that can result in an update include, without limitation, a change in network activity, e.g., high traffic. Other events can include a change to a network configuration, e.g., resolution of a trouble ticket, a failover of redundant network device, service and/or maintenance on any of the eNB, the MME, and/or the backhaul network.

Figure 5:
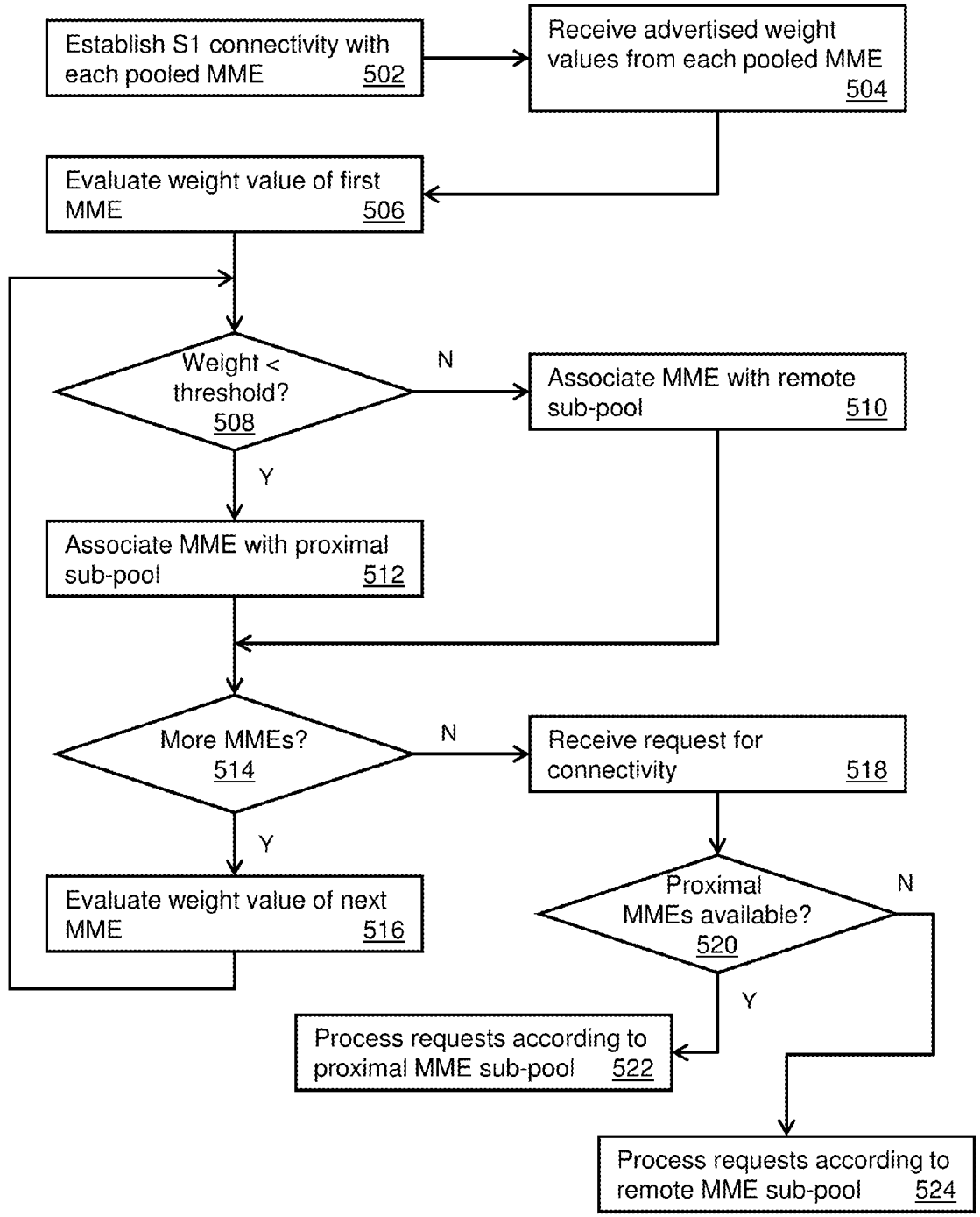
FIG. 5 depicts an illustrative embodiment of another process used in portions of the system described in FIGS. 1-3.

FIG. 5 depicts an illustrative embodiment of another process 500 used in portions of the system described in FIGS. 1-3. Connectivity is established at 502 between an eNB and each MME of the pooled MMEs. An advertised weight factor is received at 504 from each MME of the pooled MMEs. A weight factor of one of the MMEs of the pooled MMEs is evaluated at 506. A determination is made at 508 as to whether the weight factor is above or below a threshold value. In some embodiments, the threshold value can be a static value determined beforehand. The threshold is relevant in that the threshold is chosen to allow for differentiation between proximal MMEs and remote or distant MMEs.

In some embodiments, the threshold value can be a dynamic value. Such dynamic value can be determined on-the-fly, e.g., according to network configuration and/or traffic conditions. The dynamic threshold can be determined by evaluating measured and/or estimated latency values from each eNB to all MMEs of the pool. A range can be established based on measurement/estimated results and a threshold can be chosen based on the range to allow for differentiation between proximal MMEs and remote or distant MMEs. One or more of the range and/or the threshold can be updated periodically according to one or more of a schedule and an event.

To the extent the weight factor of an MME advertised to an eNB is above the threshold value, the corresponding MME is associated at 510 with a remote or distant sub-pool of the eNB. To the extent the weight factor of an MME advertised to an eNB is below the threshold value, the corresponding MME is associated at 512 with a proximal or local sub-pool of the eNB. A determination is made at 514 as to whether more MMEs of the pooled MMEs need to be evaluated. To the extent that there are more MMEs, a weight factor of another one of the MMEs is determined at 516. The weight factor is compared to the threshold at 508, and the process continues from 508 for the new weight factor, as described above.

To the extent that there are no more MMEs to be evaluated, a request for connectivity is received at 518. The request can be received at one of the eNBs from a UE within a cell served by the eNB. In response to receiving the request, a determination is made at 520 as to whether any proximal MMEs are available at 520. Such a determination can be made by simply assigning one of the MMEs associated with the proximal sub-group for the associated eNB. Such assignment can be made according to a selection algorithm, such as a round-robin selection algorithm. This allows a sharing and/or spreading at the eNB of a load across pooled MMEs of the proximal sub-pool.

To the extent that a proximal MME is available, the eNB or an eNB scheduler processes the request according to an MME of the proximal MME sub-pool. To the extent that a proximal MME is not available, the eNB or the eNB scheduler processes the request according to another MME of the remote MME sub-pool. Selection of a particular MME of the remote MME sub-pool can be according to an algorithm, including any of the algorithms disclosed herein.

Figure 6:
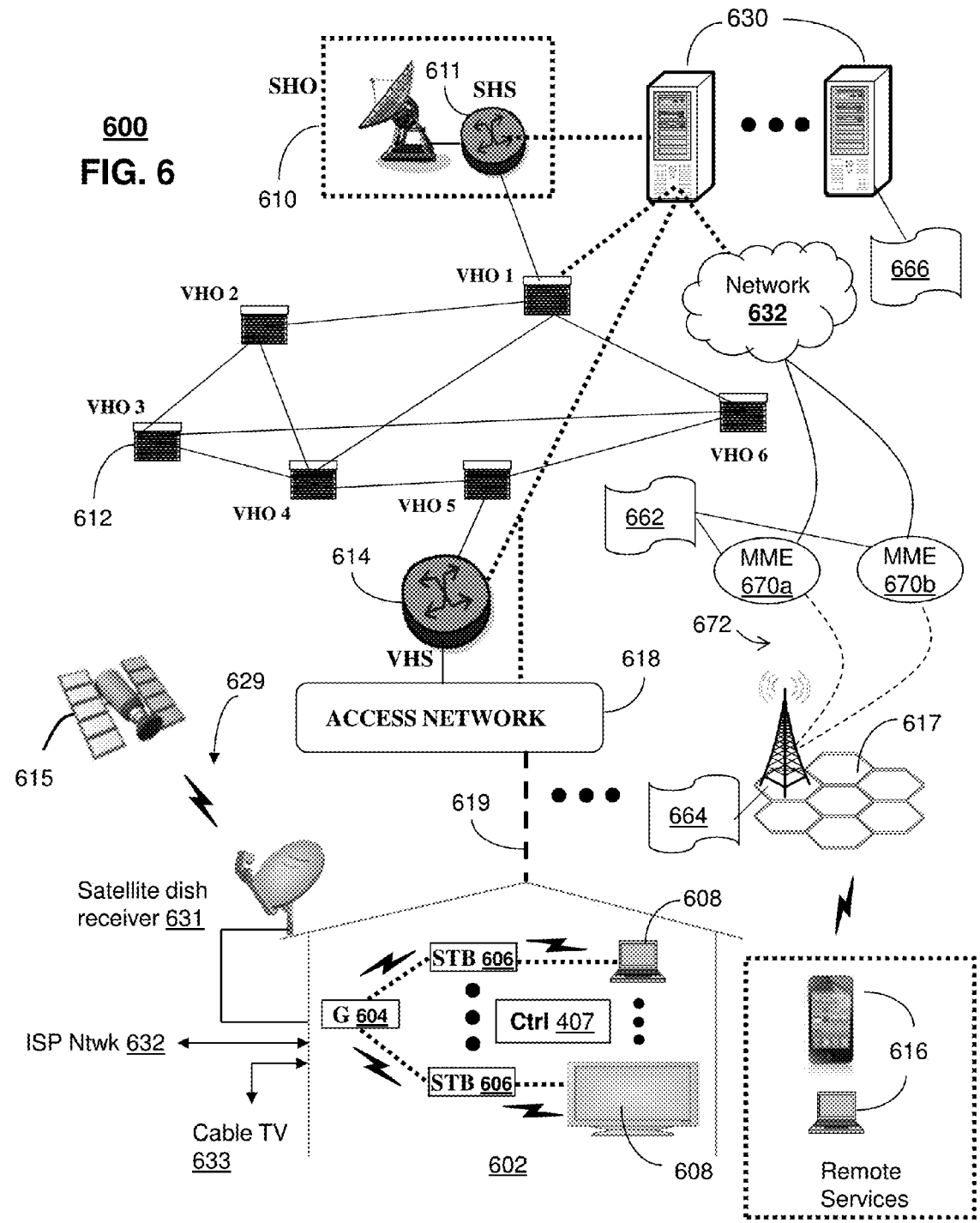
FIGS. 6-7 depict illustrative embodiments of communication systems that provide media services over wireless communication networks of FIGS. 1-3.

FIG. 6 depicts an illustrative embodiment of a first communication system 600 for delivering media content. The communication system 600 can represent an Internet Protocol Television (IPTV) media system. The communication system 600 can be overlaid or operably coupled with the systems 100, 200, 300 of FIGS. 1, 2 and/or 3 as other representative embodiments of the communication system 600. For instance, one or more devices illustrated in the communication system 600 of FIG. 6 determines message transfer delays associated with network traffic of a backhaul network 672. The backhaul network 672 is coupled between a number of core network nodes 670a, 670b, generally 670, of a wireless network and a wireless access node 617 of the wireless network. The message transfer delays are representative of the network traffic between the core network nodes and the wireless access node. Weighting factors are assigned to the core network nodes 670 based on the message transfer delays. The weighting factors are exposed to a scheduler that identifies a first group of core network nodes and a second group of core network nodes based on the weighting factors. The wireless access node 617 preferentially establishes communications via the first group of core network nodes, indicative of transport delays or times having a relative low latency. The wireless access node establishes communications via the second group, indicative of transport delays or times having a relatively high latency, responsive to an inability to establish communications via any core network nodes the first group.

The IPTV media system can include a super head-end office (SHO) 610 with at least one super headend office server (SHS) 611 which receives media content from satellite and/or terrestrial communication systems. In the present context, media content can represent, for example, audio content, moving image content such as 2D or 3D videos, video games, virtual reality content, still image content, and combinations thereof. The SHS server 611 can forward packets associated with the media content to one or more video head-end servers (VHS) 614 via a network of video head-end offices (VHO) 612 according to a multicast communication protocol.

The VHS 614 can distribute multimedia broadcast content via an access network 618 to commercial and/or residential buildings 602 housing a gateway 604 (such as a residential or commercial gateway). The access network 618 can represent a group of digital subscriber line access multiplexers (DSLAMs) located in a central office or a service area interface that provide broadband services over fiber optical links or copper twisted pairs 619 to buildings 602. The gateway 604 can use communication technology to distribute broadcast signals to media processors 606 such as Set-Top Boxes (STBs) which in turn present broadcast channels to media devices 608 such as computers or television sets managed in some instances by a media controller 607 (such as an infrared or RF remote controller).

The gateway 604, the media processors 606, and media devices 608 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 606 and subsystems of the IPTV media system for services such as video-on-demand (VoD), browsing an electronic programming guide (EPG), or other infrastructure services.

A satellite broadcast television system 629 can be used in the media system of FIG. 6. The satellite broadcast television system can be overlaid, operably coupled with, or replace the IPTV system as another representative embodiment of communication system 600. In this embodiment, signals transmitted by a satellite 615 that include media content can be received by a satellite dish receiver 631 coupled to the building 602. Modulated signals received by the satellite dish receiver 631 can be transferred to the media processors 606 for demodulating, decoding, encoding, and/or distributing broadcast channels to the media devices 608.

The media processors 606 can be equipped with a broadband port to an Internet Service Provider (ISP) network 632 to enable interactive services such as VoD and EPG as described above.

In yet another embodiment, an analog or digital cable broadcast distribution system such as cable TV system 633 can be overlaid, operably coupled with, or replace the IPTV system and/or the satellite TV system as another representative embodiment of communication system 600. In this embodiment, the cable TV system 633 can also provide Internet, telephony, and interactive media services. System 600 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 630, a portion of which can operate as a web server for providing web portal services over the ISP network 632 to wireline media devices 608 or wireless communication devices 616.

The communication system 600 can also provide for all or a portion of the computing devices 630 to function as a geo-redundant controller (herein referred to as geo-redundant controller 630). The geo-redundant controller 630 can use computing and communication technology to perform a function 666, which can include among other things, determining latency values and or weighting factors described by processes 400, 500 of FIGS. 4 and/or 5. For instance, the function 666 of the geo-redundant controller 630 can be similar to the functions described for server 630 of FIG. 7 in accordance with the processes 400, 500 of FIGS. 4 and/or 5. The MMEs 670a, 670b can be provisioned with software functions 662, respectively, to determining latency values and or weighting factors described by processes 400, 500 of FIGS. 4 and/or 5. For instance, functions 662 and 664 of the MME 670 and the wireless access point 617 can be similar to the functions described for the eNBs 102, 202, 302 or the MMEs 108, 208, 308 of FIGS. 1, 2 and/or 3 in accordance with process 400, 500 of FIGS. 4 and/or 5.

Multiple forms of media services can be offered to media devices over landline technologies such as those described above. Additionally, media services can be offered to media devices by way of a wireless access base station 617 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 7:
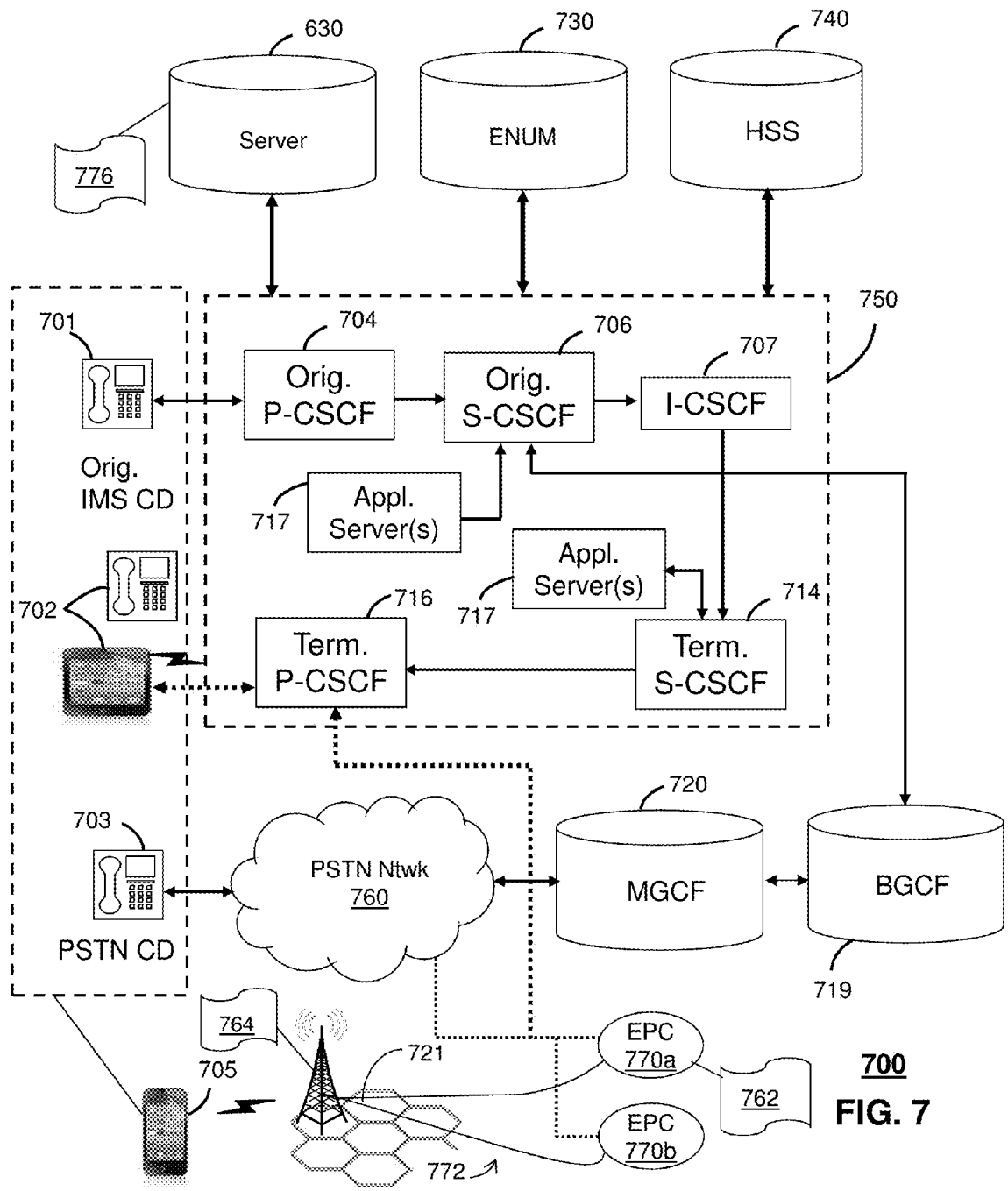

FIG. 7 depicts an illustrative embodiment of a communication system 700 employing an IP Multimedia Subsystem (IMS) network architecture to facilitate the combined services of circuit-switched and packet-switched systems. The communication system 700 can be overlaid or operably coupled with the systems 100, 200, 300 of FIGS. 1, 2 and/or 3 and communication system 600 of FIG. 6, as another representative embodiment of communication system 600. The system 700 is configured to determine message transfer delays associated with network traffic of a backhaul network 772. The backhaul network 772 is coupled between a number of core network nodes 770a, 770b, generally 770, of a wireless network and a wireless access node 721 of the wireless network. The message transfer delays are representative of the network traffic between the core network nodes 770 and the wireless access node 721. Weighting factors are assigned to the core network nodes 770 based on the message transfer delays. The weighting factors are exposed to a scheduler that identifies a first group of core network nodes and a second group of core network nodes based on the weighting factors. The wireless access node 721 preferentially establishes communications via the first group of core network nodes, indicative of transport delays or times having a relative low latency. The wireless access node 721 establishes communications via the second group, indicative of transport delays or times having a relatively high latency, responsive to an inability to establish communications via any core network nodes the first group.

The communication system 700 can comprise a Home Subscriber Server (HSS) 740, a tElephone NUmber Mapping (ENUM) server 730, and other network elements of an IMS network 750. The IMS network 750 can establish communications between IMS-compliant communication devices (CDs) 701, 702, Public Switched Telephone Network (PSTN) CDs 703, 705, and combinations thereof by way of a Media Gateway Control Function (MGCF) 720 coupled to a PSTN network 760. The MGCF 720 need not be used when a communication session involves IMS CD to IMS CD communications. A communication session involving at least one PSTN CD may utilize the MGCF 720.

IMS CDs 701, 702 can register with the IMS network 750 by contacting a Proxy Call Session Control Function (P-CSCF) which communicates with an interrogating CSCF (I-CSCF), which in turn, communicates with a Serving CSCF (S-CSCF) to register the CDs with the HSS 740. To initiate a communication session between CDs, an originating IMS CD 701 can submit a Session Initiation Protocol (SIP INVITE) message to an originating P-CSCF 704 which communicates with a corresponding originating S-CSCF 706. The originating S-CSCF 706 can submit the SIP INVITE message to one or more application servers (ASs) 717 that can provide a variety of services to IMS subscribers.

For example, the application servers 717 can be used to perform originating call feature treatment functions on the calling party number received by the originating S-CSCF 706 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 706 can submit queries to the ENUM system 730 to translate an E.164 telephone number in the SIP INVITE message to a SIP Uniform Resource Identifier (URI) if the terminating communication device is IMS-compliant. The SIP URI can be used by an Interrogating CSCF (I-CSCF) 707 to submit a query to the HSS 740 to identify a terminating S-CSCF 714 associated with a terminating IMS CD such as reference 702. Once identified, the I-CSCF 707 can submit the SIP INVITE message to the terminating S-CSCF 714. The terminating S-CSCF 714 can then identify a terminating P-CSCF 716 associated with the terminating CD 702. The P-CSCF 716 may then signal the CD 702 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 7 may be interchangeable. It is further noted that communication system 700 can be adapted to support video conferencing. In addition, communication system 700 can be adapted to provide the IMS CDs 701, 702 with the multimedia and Internet services of communication system 600 of FIG. 6.

If the terminating communication device is instead a PSTN CD such as CD 703 or CD 705 (in instances where the cellular phone only supports circuit-switched voice communications), the ENUM system 730 can respond with an unsuccessful address resolution which can cause the originating S-CSCF 706 to forward the call to the MGCF 720 via a Breakout Gateway Control Function (BGCF) 719. The MGCF 720 can then initiate the call to the terminating PSTN CD over the PSTN network 760 to enable the calling and called parties to engage in voice and/or data communications.

It is further appreciated that the CDs of FIG. 7 can operate as wireline or wireless devices. For example, the CDs of FIG. 7 can be communicatively coupled to a cellular base station 721, a femtocell, a WiFi router, a Digital Enhanced Cordless Telecommunications (DECT) base unit, or another suitable wireless access unit to establish communications with the IMS network 750 of FIG. 7. The cellular access base station 721 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 7.

Cellular phones supporting LTE can support packet-switched voice and packet-switched data communications and thus may operate as IMS-compliant mobile devices. In this embodiment, the cellular base station 721 may communicate directly with the IMS network 750 as shown by the arrow connecting the cellular base station 721 and the P-CSCF 716.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The geo-redundant controller 630 of FIG. 6 can be operably coupled to communication system 700 for purposes similar to those described above. The geo-redundant controller 630 can perform function 666 and thereby provide latency evaluation and/or MME weighting services to the base station 721 of FIG. 7, similar to the functions described for server 630 of FIG. 7 in accordance with the processes 400, 500 of FIGS. 4 and/or 5. The base station 721 and/or the core network nodes, or MMEs 770, can be adapted with software to perform functions 764 and 762, respectively to perform the latency sensitive functions described in accordance with the processes 400, 500 of FIGS. 4 and/or 5. The geo-redundant controller 630 can be an integral part of the application server(s) 717 performing function 776, which can be substantially similar to function 666 and adapted to the operations of the IMS network 750.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 8:
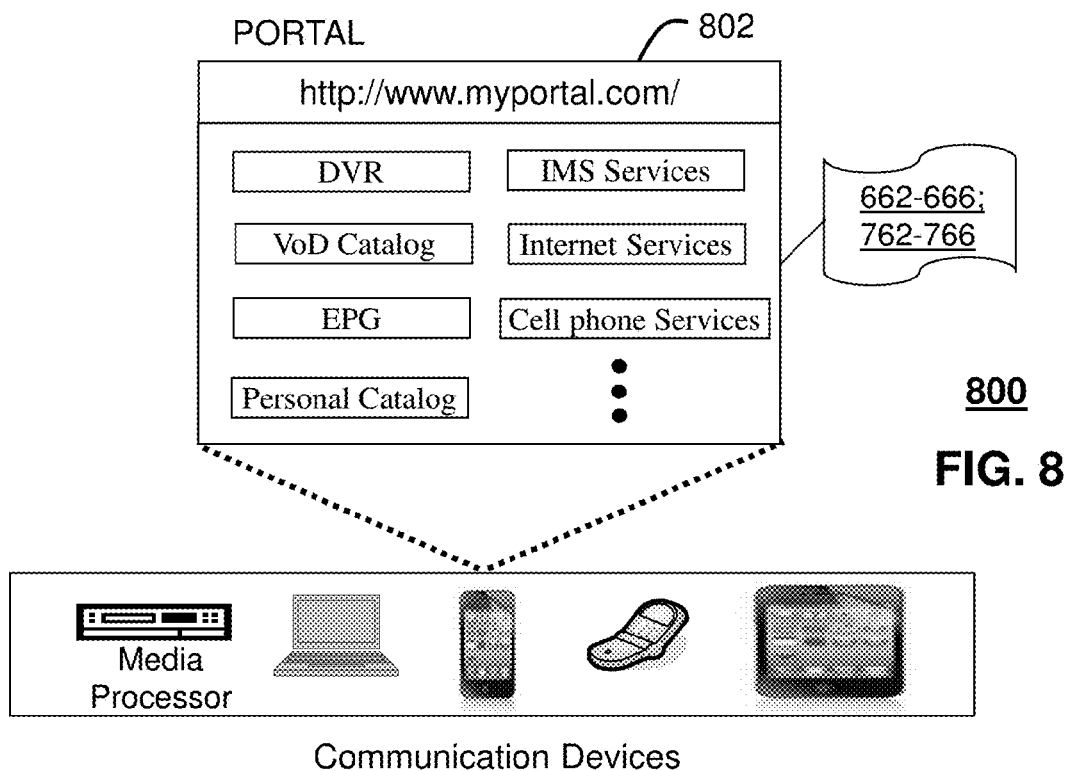
FIG. 8 depicts an illustrative embodiment of a web portal for interacting with the communication systems of FIGS. 1-3, and 6-7.

FIG. 8 depicts an illustrative embodiment of a web portal 802 of a communication system 800. Communication system 800 can be overlaid or operably coupled with the systems 100, 200, 300 of FIGS. 1, 2 and/or 3, communication system 600, and/or communication system 700 as another representative embodiment of the systems 100, 200, 300 of FIGS. 1, 2 and/or 3, communication system 600, and/or communication system 700. The web portal 802 can be used for managing services of the systems 100, 200, 300 of FIGS. 1, 2 and/or 3, and communication systems 600-700. A web page of the web portal 802 can be accessed by a Uniform Resource Locator (URL) with an Internet browser using an Internet-capable communication device such as those described in FIGS. 1, 2 and/or 3 and FIGS. 6-7. The web portal 802 can be configured, for example, to access a media processor 606 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 606. The web portal 802 can also be used for provisioning IMS services described earlier, provisioning Internet services, provisioning cellular phone services, and so on.

The web portal 802 can further be utilized to manage and provision software applications 662-666, and 762-722 to adapt these applications as may be desired by subscribers and/or service providers of systems 100, 200, 300 of FIGS. 1, 2 and/or 3, and communication systems 600-700. For instance, wireless network service providers, as users of the services provided by the MMEs 108, 208, 308 or geo-redundant controller 630 can log into on-line accounts and provision the MMEs 108, 208, 308 or geo-redundant controller 630 with configuration parameters. For example, the service providers can program or otherwise configure threshold values, sample periods, whether samples are averaged and for how many samples, update cycles, and so on. Service providers can log onto an administrator account to provision, monitor and/or maintain the systems 100, 200, 300 of FIGS. 1, 2 and/or 3 or the geo-redundant controller 630.

Figure 9:
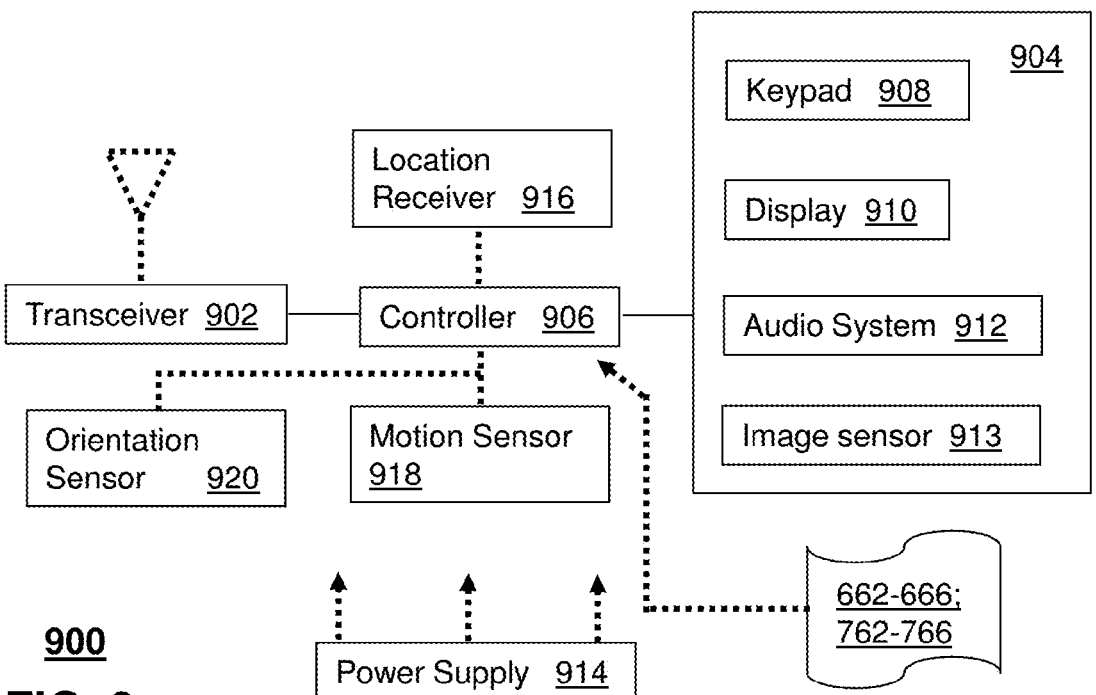
FIG. 9 depicts an illustrative embodiment of a communication device.

FIG. 9 depicts an illustrative embodiment of a communication device 900. Communication device 900 can serve in whole or in part as an illustrative embodiment of the devices depicted in FIGS. 1, 2 and/or 3, and FIGS. 6-7 and can be configured to perform portions of the process 400, 500 of FIGS. 4 and/or 5.

Communication device 900 can comprise a wireline and/or wireless transceiver 902 (herein transceiver 902), a user interface (UI) 904, a power supply 914, a location receiver 916, a motion sensor 918, an orientation sensor 920, and a controller 906 for managing operations thereof. The transceiver 902 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 902 can also be adapted to support circuit-switched wireline access technologies (such as PSTN), packet-switched wireline access technologies (such as TCP/IP, VoIP, etc.), and combinations thereof.

The UI 904 can include a depressible or touch-sensitive keypad 908 with a navigation mechanism such as a roller ball, a joystick, a mouse, or a navigation disk for manipulating operations of the communication device 900. The keypad 908 can be an integral part of a housing assembly of the communication device 900 or an independent device operably coupled thereto by a tethered wireline interface (such as a USB cable) or a wireless interface supporting for example Bluetooth®. The keypad 908 can represent a numeric keypad commonly used by phones, and/or a QWERTY keypad with alphanumeric keys. The UI 904 can further include a display 910 such as monochrome or color LCD (Liquid Crystal Display), OLED (Organic Light Emitting Diode) or other suitable display technology for conveying images to an end user of the communication device 900. In an embodiment where the display 910 is touch-sensitive, a portion or all of the keypad 908 can be presented by way of the display 910 with navigation features.

The display 910 can use touch screen technology to also serve as a user interface for detecting user input. As a touch screen display, the communication device 900 can be adapted to present a user interface with graphical user interface (GUI) elements that can be selected by a user with a touch of a finger. The touch screen display 910 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 910 can be an integral part of the housing assembly of the communication device 900 or an independent device communicatively coupled thereto by a tethered wireline interface (such as a cable) or a wireless interface.

The UI 904 can also include an audio system 912 that utilizes audio technology for conveying low volume audio (such as audio heard in proximity of a human ear) and high volume audio (such as speakerphone for hands free operation). The audio system 912 can further include a microphone for receiving audible signals of an end user. The audio system 912 can also be used for voice recognition applications. The UI 904 can further include an image sensor 913 such as a charged coupled device (CCD) camera for capturing still or moving images.

The power supply 914 can utilize common power management technologies such as replaceable and rechargeable batteries, supply regulation technologies, and/or charging system technologies for supplying energy to the components of the communication device 900 to facilitate long-range or short-range portable applications. Alternatively, or in combination, the charging system can utilize external power sources such as DC power supplied over a physical interface such as a USB port or other suitable tethering technologies.

The location receiver 916 can utilize location technology such as a global positioning system (GPS) receiver capable of assisted GPS for identifying a location of the communication device 900 based on signals generated by a constellation of GPS satellites, which can be used for facilitating location services such as navigation. The motion sensor 918 can utilize motion sensing technology such as an accelerometer, a gyroscope, or other suitable motion sensing technology to detect motion of the communication device 900 in three-dimensional space. The orientation sensor 920 can utilize orientation sensing technology such as a magnetometer to detect the orientation of the communication device 900 (north, south, west, and east, as well as combined orientations in degrees, minutes, or other suitable orientation metrics).

The communication device 900 can use the transceiver 902 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 906 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 900.

Other components not shown in FIG. 9 can be used in one or more embodiments of the subject disclosure. For instance, the communication device 900 can include a reset button (not shown). The reset button can be used to reset the controller 906 of the communication device 900. In yet another embodiment, the communication device 900 can also include a factory default setting button positioned, for example, below a small hole in a housing assembly of the communication device 900 to force the communication device 900 to re-establish factory settings. In this embodiment, a user can use a protruding object such as a pen or paper clip tip to reach into the hole and depress the default setting button. The communication device 900 can also include a slot for adding or removing an identity module such as a Subscriber Identity Module (SIM) card. SIM cards can be used for identifying subscriber services, executing programs, storing subscriber data, and so forth.

The communication device 900 as described herein can operate with more or less of the circuit components shown in FIG. 9. These variant embodiments can be used in one or more embodiments of the subject disclosure.

The communication device 900 can be adapted to perform the functions of any of the devices of the systems 100, 200, 300 of FIGS. 1, 2 and/or 3, the media processor 606, the media devices 608, or the portable communication devices 616 of FIG. 6, as well as the IMS CDs 701-702 and PSTN CDs 703-705 of FIG. 7. It will be appreciated that the communication device 900 can also represent other devices that can operate in systems 100, 200, 300 of FIGS. 1, 2 and/or 3, communication systems 600-700 of FIGS. 6-7 such as a gaming console and a media player. In addition, the controller 906 can be adapted in various embodiments to perform the functions 662-666 and 762-766, respectively.

Upon reviewing the aforementioned embodiments, it would be evident to an artisan with ordinary skill in the art that said embodiments can be modified, reduced, or enhanced without departing from the scope of the claims described below. For example, in some embodiments, the core network node, e.g., MME, selection techniques disclosed herein, can be applied to LTE broadcast video network solutions. In such solutions, eNBs that are eMBMS capable are configured with distributed MCE architectures to setup last-leg MBMS signaling with such MMEs. These MMEs can interface with specific geo-redundant MBMS-GW network elements to be able to complete the end-to-end MBMS session establishment and prepare the eNBs to be able to join the multicast sessions with the MBMS-GW for user data reception that will be broadcasted by the eNBs to the UEs capable of supporting such services.

Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 10:
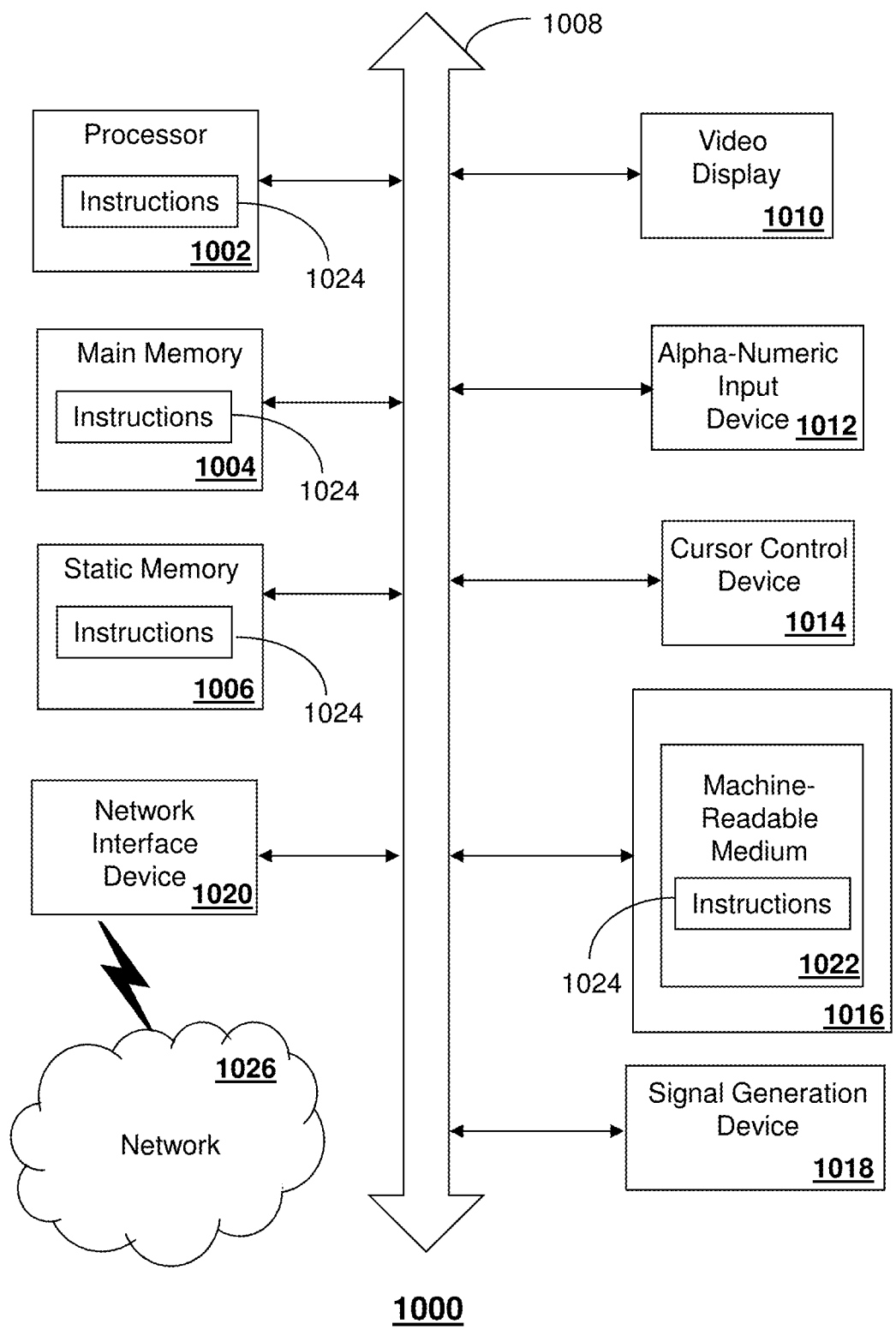
FIG. 10 is a diagrammatic representation of a machine in the form of a computer system within which a set of instructions, when executed, may cause the machine to perform any one or more of the methods described herein.

FIG. 10 depicts an exemplary diagrammatic representation of a machine in the form of a computer system 1000 within which a set of instructions, when executed, may cause the machine to perform any one or more of the methods described above. One or more instances of the machine can operate, for example, as the geo-redundant controller 630, the wireless access terminal 102, 202, 302, the core network node 108, 208, 308 and other devices of FIGS. 1-3 and 6-7. In some embodiments, the machine may be connected (e.g., using a network 1026) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1000 may include a processor (or controller) 1002 (e.g., a central processing unit (CPU)), a graphics processing unit (GPU, or both), a main memory 1004 and a static memory 1006, which communicate with each other via a bus 1008. The computer system 1000 may further include a display unit 1010 (e.g., a liquid crystal display (LCD), a flat panel, or a solid state display). The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020. In distributed environments, the embodiments described in the subject disclosure can be adapted to utilize multiple display units 1010 controlled by two or more computer systems 1000. In this configuration, presentations described by the subject disclosure may in part be shown in a first of the display units 1010, while the remaining portion is presented in a second of the display units 1010.

The disk drive unit 1016 may include a tangible computer-readable storage medium 1022 on which is stored one or more sets of instructions (e.g., software 1024) embodying any one or more of the methods or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

The proximity based base station-core network node, e.g., eNB-MME S1-MME, interface disclosed herein, in combination with geo-redundant core network node, MME, sub pools improve performance by preferring communications with proximal core network nodes resulting in a relatively low latency. Selection of proximal signal nodes from a geo-redundant pool can include relative capacity assignment logic, e.g., in an MME, based on transport latency, e.g., obtained by way of SCTP sampled SRTT. The techniques disclosed herein further promote "best-in-class" LTE networks, making them available to subscribers by encompassing carrier grade network resiliency, with low latency and low operational cost.

It should be understood that although the illustrative examples refer to geo-redundant pooling of MMEs in an LTE wireless network, the techniques are more generally applicable to geo-redundant pooling of network elements or devices. The network devices can include any device typically employed in network applications, such as routers, switches, servers, bridges and the like. The network elements can be physical and/or virtual.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1022 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1000.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
   accessing, by a system comprising a processor, transport layer control information associated with network traffic of a backhaul network communicatively coupled between a plurality of core network nodes of a wireless communication network and a radio access node of the wireless communication network, wherein the radio access node is communicatively coupled to the plurality of core network nodes by way of the backhaul network;
   determining, by the system, a plurality of message transfer delays based on the transport layer control information, wherein the plurality of message transfer delays are representative of the network traffic between the plurality of core network nodes and the radio access node;
   assigning, by the system, a plurality of weighting factors to the plurality of core network nodes based on the plurality of message transfer delays; and
   providing, by the system, a scheduler with access to the plurality of weighting factors to enable the scheduler to identify a first group of core network nodes of the plurality of core network nodes and a second group of core network nodes of the plurality of core network nodes based on the plurality of weighting factors,
   wherein the providing of the access enables the radio access node to establish communications links with the first and second groups of core network nodes, selectively sending communications messages:
      via a first core network node of the first group of core network nodes responsive to a first determination that the first core network node is available to establish the communications, and
      via a second core network node of the second group of core network nodes responsive to a second determination of an inability to establish the communications via any core network nodes of the first group of core network nodes or responsive to a second determination of excessive transport delays to any signaling nodes in a first group of signaling nodes.

2. The method of claim 1, further comprising:
   repeating periodically, by the system, the determining of the plurality of message transfer delays to obtain an updated plurality of message transfer delays;
   assigning, by the system, a plurality of updated weighting factors to the plurality of core network nodes based on the updated plurality of message transfer delays; and
   providing, by the system, the scheduler with access to the plurality of updated weighting factors to enable the scheduler to re-associate a third core network node of the plurality of core network nodes with one of the first group of core network nodes or the second group of core network nodes.

3. The method of claim 1, wherein the determining of the plurality of message transfer delays comprises determining a round trip time of a stream-control-transmission-protocol message exchanged between the plurality of core network nodes and the radio access node.

4. The method of claim 3, wherein the first core network node comprises a mobility management entity of an evolved packet core of a long term evolution network, and wherein the radio access node comprises an evolved Node B.

5. The method of claim 4, further comprising comparing the message transfer delays to a static predefined threshold value, and determining the plurality of weighting factors based on the comparing of the message transfer delays to the static predefined threshold value.

6. The method of claim 5, further comprising determining service level agreement latency values of the backhaul network, wherein the plurality of weighting factors are based on the plurality of message transfer delays and the service level agreement latency values.

7. The method of claim 1, further comprising:
   repeating, by the system, the determining of the plurality of message transfer delays over a sample window; and
   statistically averaging, by the system, the plurality of message transfer delays over the sample window to obtain a plurality of statistically averaged message transfer delays, wherein the assigning of the plurality of weighting factors to the plurality of core network nodes is based on the plurality of statistically averaged message transfer delays.

8. A device, comprising:
   a processor; and
   a memory that stores executable instructions that, when executed by the processor, facilitate performance of operations, comprising:
      determining a plurality of message transfer delays based on transport layer control information associated with network traffic of a backhaul network communicatively coupled between a plurality of core network nodes of a wireless communication network and a wireless access node of the wireless communication network, wherein the wireless access node is communicatively coupled to the plurality of core network nodes by way of the backhaul network, wherein the message transfer delays are representative of the network traffic between the plurality of core network nodes and the wireless access node;
      assigning a plurality of weighting factors to the plurality of core network nodes based on the plurality of message transfer delays; and
      advertising the plurality of weighting factors to a scheduler that identifies a first group of core network nodes of the plurality of core network nodes and a second group of core network nodes of the plurality of core network nodes based on the plurality of weighting factors,
      wherein the advertising enables the wireless access node to send communications messages via a second core network node of the second group of core network nodes, responsive to a determination of an inability to send communications messages via a first core network node of the first group of core network nodes, or responsive to a message transfer delay above a threshold value.

9. The device of claim 8, wherein the operations further comprise:
   repeating periodically the determining of the plurality of message transfer delays to obtain an updated plurality of message transfer delays;
   assigning a plurality of updated weighting factors to the plurality of core network nodes based on the updated plurality of message transfer delays; and advertising the plurality of updated weighting factors to the scheduler to enable the scheduler to re-associate a third core network node of the plurality of core network nodes with one of the first group of core network nodes or the second group of core network nodes.

10. The device of claim 8, wherein the determining of the plurality of message transfer delays comprises determining a round trip time of a stream-control-transmission-protocol message exchanged between the plurality of core network nodes and the wireless access node, and wherein the advertising enables the wireless access node to establish the communications via the first core network node of the first group of core network nodes responsive to a first determination that the first core network node is available to establish the communications.

11. The device of claim 8, wherein the second core network node comprises a mobility management entity of an evolved packet core of a long term evolution network, and wherein the wireless access node comprises an evolved Node B.

12. The device of claim 11, wherein the operations further comprise comparing the message transfer delays to a static predefined threshold value, and determining the plurality of weighting factors based on the comparing of the message transfer delays to the static predefined threshold value.

13. The device of claim 12, wherein the operations further comprise: determining service level agreement latency values of the backhaul network, wherein the plurality of weighting factors are based on the plurality of message transfer delays and the service level agreement latency values.

14. The device of claim 8, wherein the operations further comprise:
repeating the determining of the plurality of message transfer delays over a sample window; and
statistically averaging the plurality of message transfer delays over the sample window to obtain a plurality of statistically averaged message transfer delays, wherein the assigning of the plurality of weighting factors to the plurality of core network nodes is based on the plurality of statistically averaged message transfer delays.

15. A machine-readable storage medium, comprising executable instructions that, when executed by a processor, facilitate performance of operations, comprising:
determining a plurality of latency values associated with network traffic of a backhaul network communicatively coupled between a plurality of core network nodes of a wireless communication network and a wireless access node of the wireless communication network, wherein the wireless access node is associated with the plurality of core network nodes and communicatively coupled to the plurality of core network nodes by way of the backhaul network;
determining a plurality of weighting factors based on the plurality of latency values;
associating the plurality of weighting factors with the plurality of core network nodes; and
providing the plurality of weighting factors to the wireless access node that identifies a first group of core network nodes of the plurality of core network nodes and a second group of core network nodes of the plurality of core network nodes based on the plurality of weighting factors, wherein the wireless access node establishes communications links with the first and second groups of core network nodes, the wireless access node preferentially sending communications messages via a core network node of the first group of core network nodes, and wherein the wireless access node sends communications messages via a core network node of the second group of core network nodes, responsive to an inability to send communications messages via any core network nodes the first group of core network nodes or responsive to excessive transport delays to any signaling nodes in a first group of signaling nodes.

16. The machine-readable storage medium of claim 15, wherein the operations further comprise:
repeating periodically the determining of the plurality of latency values to obtain an updated plurality of message transfer delays;
assigning a plurality of updated weighting factors to the plurality of core network nodes based on the updated plurality of message transfer delays; and
advertising the plurality of updated weighting factors to the wireless access node to allow the wireless access node to re-associate a core network node of the plurality of core network nodes with one of the first group of core network nodes or the second group of core network nodes.

17. The machine-readable storage medium of claim 15, wherein the determining of the plurality of latency values comprises determining a round trip time of a stream-control-transmission-protocol message exchanged between the plurality of core network nodes and the wireless access node.

18. The machine-readable storage medium of claim 15, wherein the operations further comprise comparing the latency values to a static predefined threshold value, and determining the plurality of weighting factors based on the comparing of the latency values to the static predefined threshold value.

19. The machine-readable storage medium of claim 18, wherein the operations further comprise, determining service level agreement latency values of the backhaul network, wherein the a plurality of weighting factors are based on the plurality of latency values and the service level agreement latency values.

20. The machine-readable storage medium of claim 18, further comprising:
repeating the determining of the plurality of latency values over a sample window; and
statistically averaging the plurality of latency values over the sample window to obtain a plurality of statistically averaged latency values, wherein the associating of the plurality of weighting factors to the plurality of core network nodes is based on the plurality of statistically averaged latency values.

* * * * *